(12) United States Patent
Brockington-Hill et al.

(10) Patent No.: US 11,132,347 B2
(45) Date of Patent: *Sep. 28, 2021

(54) SELECTING BACKING STORES BASED ON DATA REQUEST

(71) Applicant: Palantir Technologies Inc., Palo Alto, CA (US)

(72) Inventors: Christopher Brockington-Hill, London (GB); Neil Rickards, Hertfordshire (GB)

(73) Assignee: Palantir Technologies Inc., Palo Alto, CA (US)

( * ) Notice: Subject to any disclaimer, the term of this patent is extended or adjusted under 35 U.S.C. 154(b) by 145 days.

This patent is subject to a terminal disclaimer.

(21) Appl. No.: 16/576,428

(22) Filed: Sep. 19, 2019

(65) Prior Publication Data

US 2020/0012632 A1 Jan. 9, 2020

Related U.S. Application Data (63) Continuation of application No. 15/728,439, filed on Oct. 9, 2017, now Pat. No. 10,437,807.

(Continued)

(51) Int. Cl.
*G06F 16/22* (2019.01)
*G06F 16/2453* (2019.01)
(Continued)

(52) U.S. Cl.
CPC ........ *G06F 16/2272* (2019.01); *G06F 16/221* (2019.01); *G06F 16/245* (2019.01);
(Continued)

(58) Field of Classification Search
None
See application file for complete search history.

(56) References Cited

U.S. PATENT DOCUMENTS 6,980,984 B1  12/2005  Huffman et al.
7,657,540 B1   2/2010  Bayliss
(Continued)

FOREIGN PATENT DOCUMENTS

EP    2608070    6/2013
EP    3037992    6/2016

OTHER PUBLICATIONS

Ravishankar Ramamurthy et al: "A Case for Fractured Mirrors", Proceedings of the Twenty-Seventh International Conference on Very Large Data Bases, Roma, Sep. 11-14, Morgan Kaufman, Orlando, Fla, Jan. 1, 2002.

(Continued)

*Primary Examiner* — Richard L Bowen
(74) *Attorney, Agent, or Firm* — Hickman Becker Bingham Ledesma LLP (57) ABSTRACT

Techniques for improving database searches are described herein. In an embodiment, a server computer system stores one or more first datasets in a first data repository and one or more second datasets in a second data repository. The server computer receives a request to perform an analysis on a particular dataset. The server computer determines that the particular dataset is stored in the first data repository and the second data repository. Based, at least in part, on an attribute of the request, the server computer selects the second data repository and responds to the request with data from the particular dataset stored in the second data repository.

18 Claims, 5 Drawing Sheets

Related U.S. Application Data (60) Provisional application No. 62/529,357, filed on Jul. 6, 2017.

(51) Int. Cl.
  *G06F 21/62* (2013.01)
  *G06F 16/27* (2019.01)
  *G06F 16/245* (2019.01)

(52) U.S. Cl.
  CPC ........ *G06F 16/2453* (2019.01); *G06F 16/278* (2019.01); *G06F 21/6218* (2013.01)

(56) References Cited

U.S. PATENT DOCUMENTS

| | | | |
|---|---|---|---|
| 7,899,796 | B1 | 3/2011 | Borthwick et al. |
| 7,900,052 | B2 | 3/2011 | Jonas |
| 8,447,722 | B1* | 5/2013 | Ahuja ............... G06F 16/283 707/607 |
| 8,655,866 | B1* | 2/2014 | Provine ............. G06F 16/951 707/713 |
| 8,972,337 | B1 | 3/2015 | Gupta |
| 9,348,920 | B1 | 5/2016 | Kesin |
| 9,722,967 | B2* | 8/2017 | Kinder ............. H04L 29/12132 |
| 9,946,537 | B2* | 4/2018 | Balasubramanian ...................... G06F 16/9535 |
| 2002/0083039 | A1 | 6/2002 | Ferrari |
| 2004/0186826 | A1 | 9/2004 | Choi |
| 2007/0130206 | A1 | 6/2007 | Zhou et al. |
| 2008/0071731 | A1 | 3/2008 | Ma et al. |
| 2009/0024589 | A1 | 1/2009 | Sood et al. |
| 2010/0114887 | A1 | 5/2010 | Conway et al. |
| 2011/0219020 | A1 | 9/2011 | Oks |
| 2011/0258190 | A1 | 10/2011 | Chen et al. |
| 2012/0084316 | A1 | 4/2012 | Koenig |
| 2012/0159312 | A1 | 6/2012 | Mital et al. |
| 2012/0278273 | A1 | 11/2012 | Fang |
| 2013/0024484 | A1 | 1/2013 | Banerjee |
| 2013/0304770 | A1 | 11/2013 | Boero et al. |
| 2014/0090081 | A1 | 3/2014 | Mattsson |
| 2014/0330845 | A1 | 11/2014 | Feldschuh |
| 2014/0379755 | A1 | 12/2014 | Kuriakose et al. |
| 2015/0234898 | A1 | 8/2015 | Choi et al. |
| 2016/0029248 | A1 | 1/2016 | Syed |
| 2016/0034214 | A1 | 2/2016 | Kamp et al. |
| 2016/0092510 | A1 | 3/2016 | Samantaray |
| 2016/0171236 | A1 | 6/2016 | Konik |
| 2017/0220703 | A1 | 8/2017 | Martha |
| 2018/0268000 | A1* | 9/2018 | McManus ............. G06F 16/256 |

OTHER PUBLICATIONS

Afify Ghada M et al: "A hybrid filtering approach for storage optimization in main-memory cloud database", Egyptian Informatics Journal, Elsevier, Amsterdam, NL, vol. 16, No. 3, Aug. 21, 2015 (Aug. 21, 2015), pp. 329-337, XP029356693, ISSN: 1110-8665.

Official Communication for European Application No. 18181537.4 dated Sep. 5, 2018.

U.S. Appl. No. 15/728,439, filed Oct. 9, 2017, Final Office Action, dated Aug. 23, 2018.

U.S. Appl. No. 15/728,439, filed Oct. 9, 2017, First Office Action Interview, dated Mar. 22, 2018.

U.S. Appl. No. 15/728,439, filed Oct. 9, 2017, First Office Action Interview, dated Dec. 14, 2017.

U.S. Appl. No. 15/728,439, filed Oct. 9, 2017, Notice of Allowance, dated Jun. 5, 2019.

U.S. Appl. No. 15/728,439, filed Oct. 9, 2017, Office Action, dated Dec. 18, 2018.

Official Communication for European Patent Application No. 18181537.4, dated Mar. 25, 2021, 4 pages.

Current Claims for European Patent Application No. 18181537.4, dated Mar. 25, 2021, 4 pages.

* cited by examiner

SELECTING BACKING STORES BASED ON DATA REQUEST

BENEFIT CLAIM

This application claims the benefit under 35 U.S.C. § 120 as a Continuation of application Ser. No. 15/728,439, filed Oct. 9, 2017, which claims the benefit of Provisional Application 62/529,357, filed Jul. 6, 2017, the entire contents of which is hereby incorporated by reference as if fully set forth herein, under 35 U.S.C. § 119(e). The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The present disclosure relates to computer-implemented resource management systems. More specifically, the example embodiment(s) described below relate to performing queries for data stored in a database.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Analytics applications generally access large datasets to perform analytic operations. When a user wishes to perform an operation on a dataset, the user identifies where the dataset is stored and the analytics application sends a query to the server storing the dataset. The server computer system storing the dataset executes the query against the dataset and returns the requested information to the analytics application.

Depending on the type of query, executing the query against the dataset can be extremely inefficient. For example, if a user's query requests information on only a small subset of rows of a database, executing the query directly against the database requires the server computer system to check each row to determine if the row satisfies the query. Additionally, if the database is subject to row-based access controls, the data a user is allowed to access may be incredibly sparse, thereby causing the database to perform the query and then remove the rows that the user is not allowed to access.

In order to increase the efficiency of the system, a server computer system may use an index of the database. When a query contains a filtering condition or row-based access controls, the database can identify the requested rows through the index. The server computer system may then use the row identifiers to access the rows stored in the database. While the use of an index is more efficient than directly searching the database for each query, performing a query against the index followed by a query against the database may be inefficient. That inefficiency is increased if the database is stored using one application, like APACHE PARQUET, while the index is created and stored by another application, like APACHE LUCENE.

One solution is to use the index to recreate rows of the database when the index is searched. In some scenarios, recreating the rows from the index may be faster than searching the database and only returning a small number of rows. In other situations, such as when all values in a single column are being used, using the index to recreate rows in the database is less effective.

Generally, the user is responsible for identifying the target of a search query. This means that a user must know where the dataset is stored before an analysis request can be sent to the server computer system. Additionally, the user has no way of indicating to the server computer system that the server computer should use the index, not use the index, and/or rebuild rows from the index.

Thus, there is a need for a system that dynamically selects a backing store for responding to a query based on a semantic analysis of the query.

SUMMARY

The appended claims may serve to summarize the disclosure.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

Embodiments are described in sections below according to the following outline:
General Overview
System Overview
Selecting a Backing Store Based on an Attribute of a Request
Query Analysis
Adding Views of Datasets to a Second Repository
Implementation Example—Hardware Overview
Implementation Example—Basic Software System
Extensions and Alternatives

General Overview

Techniques for improving database searches are provided. In an embodiment, a server computer system stores one or more first datasets in a first data repository and one or more second datasets in a second data repository. The two data repositories may include a columnar data store and an index data repository. When a request to perform an analysis on a particular dataset is received, the server computer system determines whether the particular dataset is stored in each data repository. If the particular dataset is stored in both data repositories, the server computer system selects a data repository based on an attribute of the query, such as a size of the dataset being queried, whether the query is subject to access controls, whether the query includes an aggregation, and/or whether the query includes a filter condition.

In an embodiment, a method comprises storing, in a first data repository, one or more first datasets; storing, in a second data repository, one or more second datasets; receiving a request to perform an analysis on a particular dataset; determining that the particular dataset is stored in both the first data repository and the second data repository; selecting the second data repository based, at least in part, on the attribute of the request; responding to the request with data from the particular dataset stored in the second data repository.

System Overview

Figure 1:
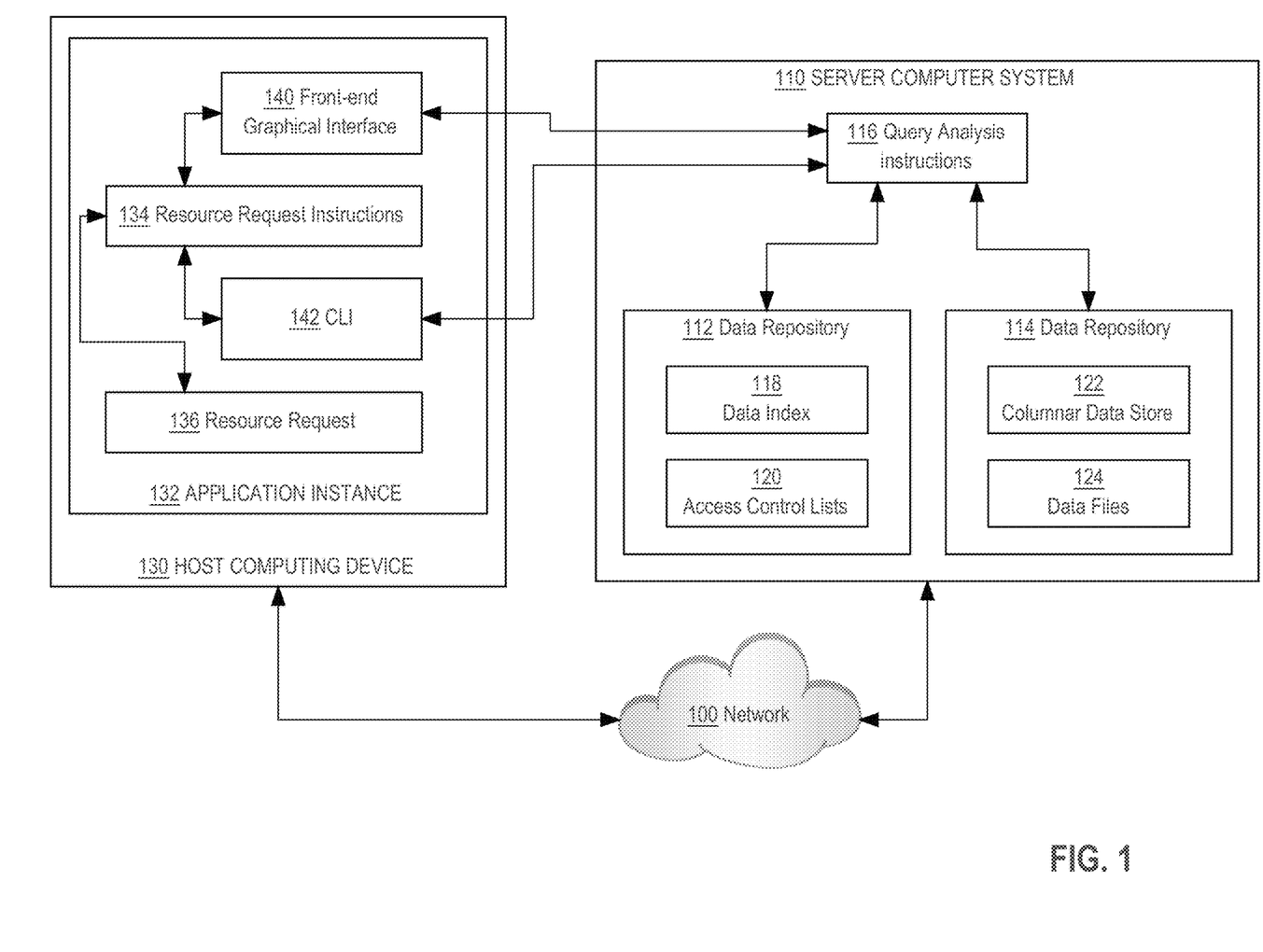
FIG. 1 depicts a schematic diagram of a distributed computing system for performance of searches for resources.

FIG. 1 depicts a schematic diagram of a distributed computing system for performance of searches for resources.

In an embodiment, a distributed computing system comprises a server computer ("server") 110 coupled via network 100 to a host computing device 130. The distributed computing environment can be within one or more data center, virtual computing facility or other hosting facilities connected to a network such as, for example, the Internet or other network; other embodiments can be within a networked home, office, or campus.

Network 100 broadly represents a combination of one or more local area networks, wide area networks, and/or inter-networks and may include the public internet. The network 100 can connect multiple hosts 130 together within the distributed computing environment. Network 100 can be composed of multiple sub-networks connected together. For example, the network 100 can be an Internet Protocol Version 4-based and/or an Internet Protocol Version 6-based wired or wireless network or a combination of multiple such networks.

Host computing device 130 broadly represents one or many computers and the number of hosts 130 in the system at a given time may vary in different embodiments and any number may be used. In an embodiment, a host 130 can be a single computing device such as, for example, the computing device 400 described below with respect to FIG. 4. Alternatively, a host 130 can be a single virtual computer instance that executes on a computing device facilitated by a virtualization layer interposed between the virtual computer instance and the computing device. The virtualization layer can be a virtual machine monitor such as, for example, virtual machine monitor 530 described below with respect to FIG. 5.

Regardless if a single computing device or a single virtual computer instance, a host 130 can be configured with an operating system such as, for example, operating system 510 described below with respect to FIG. 5. The operating system of a host 130 can manage low-level aspects of the host's operation including managing execution of processes, memory allocation, file input and output (I/O), and device I/O. Furthermore, the operating system of host 130 may manage presentation systems such as a windowed graphical user interface (GUI) and driving a computer display device such as a flat screen display or CRT. A host 130 may also be configured with a container system (e.g. the DOCKER container system) for running services within containers on the host's operating system.

Services that execute as processes on hosts in the distributed computing environment may be configured using the distributed configuration platform described herein or in application Ser. No. 15/284,959, filed Oct. 4, 2016, the entire contents of which is hereby incorporated by reference as if fully set forth herein.

In an embodiment, host 130 comprises an application instance 132 which allows one or more services to be deployed on host 130 from one or more server computing devices, such as server 110. In an embodiment, application instance 132 comprises resource request instructions 134, a front-end graphical interface 140 and a command-line interface (CLI) 142 that may interoperate to provide the functions that are described further herein. In an embodiment, the front-end interface 140 and CLI 142 are programmed or configured to interact with one or more server-side functional units of server computer 110 as further described. Host computing device 130 also manages one or more resource requests 136 using processes that are further described in other sections.

A service that application instance 132 facilitates or hosts can be a single instance of a software product or software application installed on at least one of the hosts 130. For example, a service might be a database server instance, a web server instance, or any other instance of a software product or a software application installed on one or more of the hosts 130. Multiple different services may be installed on the hosts 130 including multiple different services on the same host 130. For example, a service may be installed on multiple of the hosts 130 in a distributed, clustered, load balanced, or failover computing arrangement.

In an embodiment, server 110 comprises data repository 112 comprising data index 118 and access control lists 120, data repository 114 comprising columnar data store 122 and data files 124, and query analysis instructions 116 as further described. In an embodiment, query analysis instructions 116, when executed by one or more processors, are programmed or configured to cause server computer system 110 to receive electronic digital messages that define database operations according to a structured query language, parse the messages to determine the operations, analyze the query to identify an attribute of the query, select a datastore based on the identified attribute, and execute the operations against the selected datastore. Typically, execution of the operations causes instructing one or more worker processes to execute builds of derived datasets, based on raw datasets, with data repository 112 and/or data repository 114. In one implementation, query analysis instructions 116 comprises an executable instance of ELASTICSEARCH and/or a software layer in conjunction with ELASTICSEARCH.

In an embodiment data repository 112 comprises a distributed data storage system which stores one or more resources. The resources may comprise one or more of individual documents, folders, JSON blobs, rows in a database, user comments or flags, media files, build artifacts, and/or any other digital resource. Data repository 112 comprises data index 118 includes an index of datasets and/or other resources from data repository 114. Data index 118 may be a distributed index for more efficient searches. Access control lists 120 comprise one or more access control policies to be applied to data repository 112. For example, access control lists 120 may implement row-level access controls on data in a database. Access control lists may identify access controls for individual user identifications, role identifications, and/or user group identifications.

In an embodiment data repository 114 comprises a distributed data storage system which stores one or more resources. The resources may comprise one or more of individual documents, folders, JSON blobs, rows in a database, user comments or flags, media files, build artifacts, and/or any other digital resource. Data repository 114 comprises columnar data store 122 which stores data from one or more resources and makes the data available to analytics applications. Data repository 114 may additionally comprise data files 124. Data files 124 may comprise one or more flat files that are used as a source of data stored in columnar data store 122.

In an embodiment, data index 118 comprises one or more views of data stored in columnar data store 122. Data repository 112 may additionally store index metadata which identifies one or more sets of data in data repository 112 that are additionally stored in data index 118. The index metadata may also include data indicating which types of data are subject to access controls stored in access control lists 120.

In an embodiment, query analysis instructions 116 comprises a set of one or more pages of main memory, such as RAM, in the server 110 into which executable instructions have been loaded and which when executed cause the server to perform the functions or operations that are described herein with reference to those modules. For example, the query analysis instructions 116 may comprise a set of pages in RAM that contain instructions which when executed cause performing the query analysis functions that are described herein.

The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture.

In another embodiment, query analysis instructions 116 also may represent one or more files or projects of source code that are digitally stored in a mass storage device such as non-volatile RAM or disk storage, in the server 110 or a separate repository system, which when compiled or interpreted cause generating executable instructions which when executed cause the server 110 to perform the functions or operations that are described herein with reference to those modules. In other words, the drawing figure may represent the manner in which programmers or software developers organize and arrange source code for later compilation into an executable, or interpretation into bytecode or the equivalent, for execution by the server 110.

Selecting a Backing Store Based on an Attribute of A Request

Figure 2:
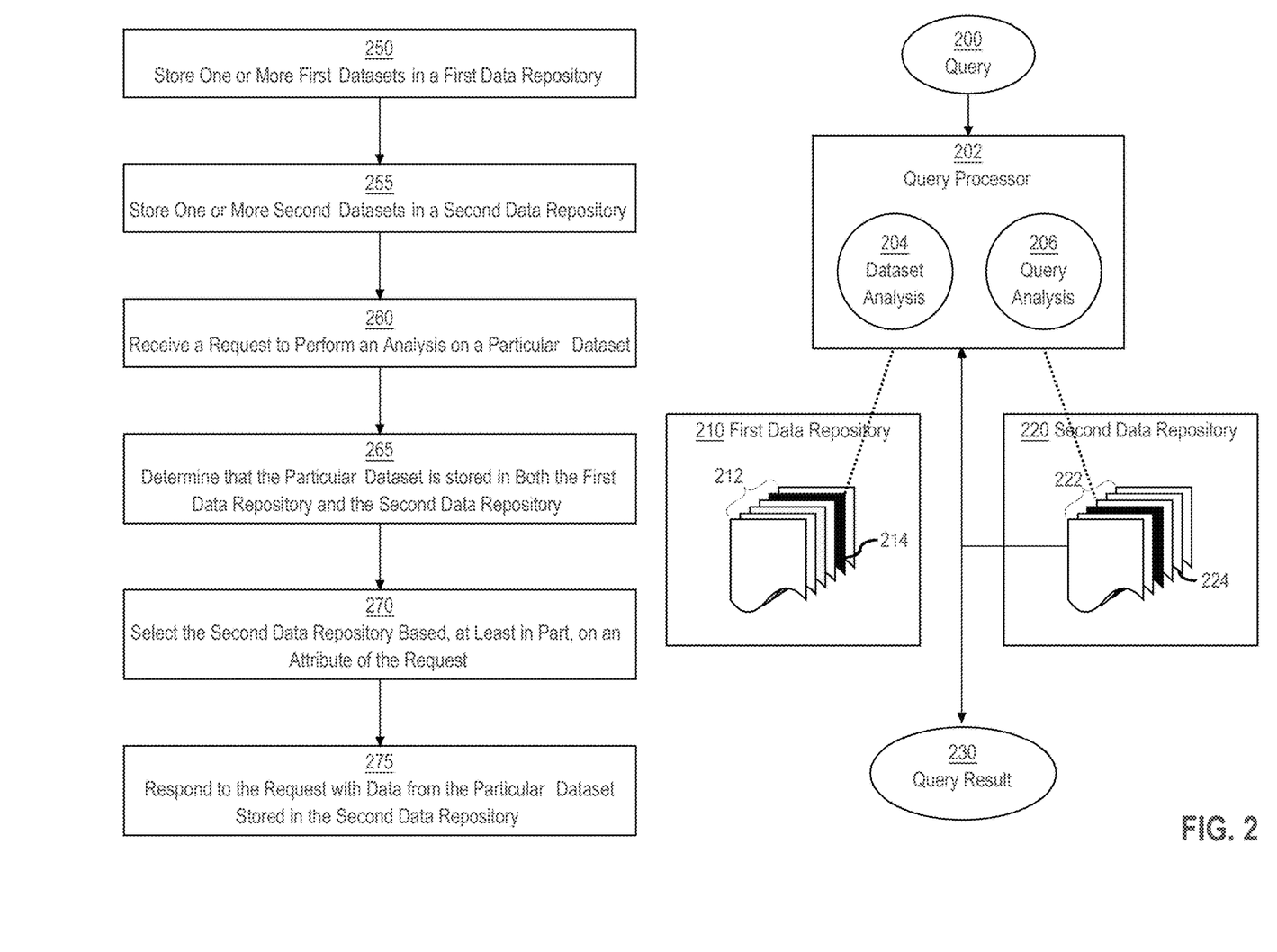
FIG. 2 depicts an example method for selecting a backing store for responding to a request to perform an analysis on a particular dataset based on an attribute of the request.

FIG. 2 depicts an example method for selecting a backing store for responding to a request to perform an analysis on a particular dataset based on an attribute of the request. FIG. 2 is described in terms of a first data repository and a second data repository for the purpose of giving a clear example. While the description below may describe the first data repository as a columnar data store and the second data repository as a distributed index, in other embodiments, the first data repository is a distributed index and the second data repository is a columnar data store. Thus, a person of skill in the art would understand that either type of data repository may be selected in step 270 based on an attribute of a request.

Figure 3:
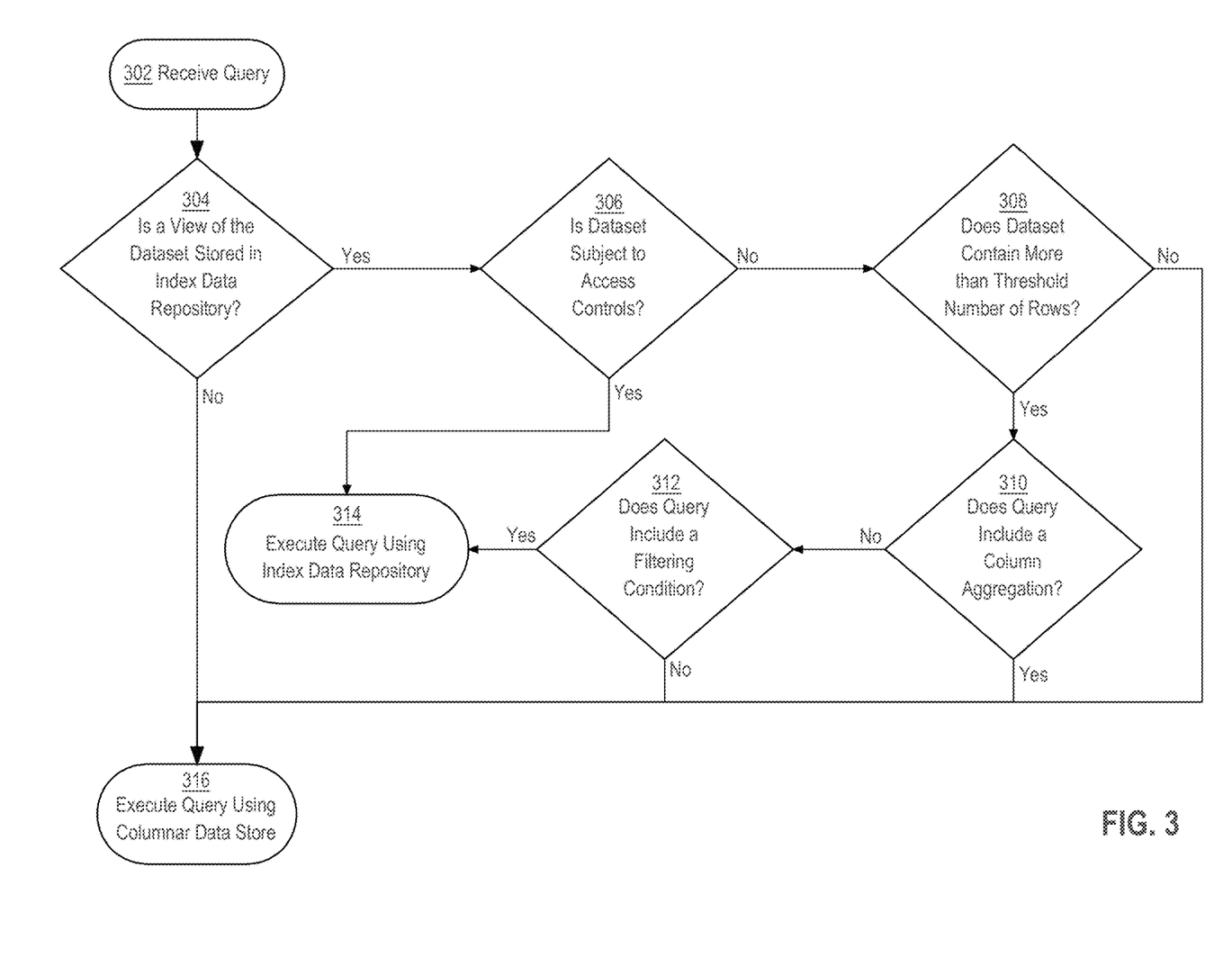
FIG. 3 depicts a depicts a method of analyzing a query to identify a backing store for responding to the query.

Each of FIG. 2, FIG. 3 and any other flow diagram or process description in this disclosure is intended to represent an algorithm or plan for programming computer programs at the same level of detail that skilled persons in this field use to communicate among themselves about the architecture, process or data flow, arrangement, ordering and content of similar computer programs of similar types. That is, the flow diagrams and process descriptions are presented at a level of detail that skilled persons in this field have determined to be sufficient to communicate between themselves the baseline information that is adequate to permit the coding, completion, testing and deployment of computer programs that will execute and operate to provide the functions that are described herein.

At step 250, one or more first datasets are stored in a first data repository. The first data repository may include one or more databases. As an example, one or more flat files may be read into a columnar data store, such as APACHE PARQUET. A dataset, as used herein, refers to a set of data to which a query may be directed. Thus, the first data repository may store datasets for different data types, customers, subsets of users in a customer group, and/or purposes for one or more users. For example, a first dataset may include sales data for a first business while a second dataset includes inventory data for the first business and a third dataset includes employee data for the first business. Each dataset may be queried individually using a structured query language which identifies the dataset.

At step 255, one or more second datasets are stored in a second data repository. The second data repository may include one or more indexes of a dataset stored in the first data repository. For example, rows from a datable may be indexed based on the columns. The index may be distributed across a plurality of nodes such that a request for data may be federated across the plurality of nodes. An example of a distributed index which may include views of data stored in a database is ELASTIC SEARCH.

In an embodiment, the second data repository stores views of one or more datasets from the first data repository. Additionally, one or more data repositories stored in the first data repository may not have a corresponding index in the second data repository. Thus, the datasets stored in the first data repository may differ from datasets stored in the second data repository. The second data repository may store index metadata that identifies which datasets stored in the first data repository are indexed in the second data repository. Additionally or/alternatively, a separate document may be stored in a separate location which identifies which datasets from the first data repository are indexed in the second data repository.

In an embodiment, the second data repository additionally includes a layer on top of one or more of the distributed indices which provides access controls for the distributed indices. For example, an access control layer may provide row-based access controls for rows of data stored in the first data repository and indexed in the second data repository. In an embodiment, the use of the access control layer may be optional for data indexed in the second data repository. The second data repository may store index metadata which identifies which datasets stored in the first data repository are subject to access controls in the second data repository. Additionally or/alternatively, a separate document may be stored in a separate location which identifies which datasets stored in the first data repository are subject to access controls in the second data repository.

At step 260, a request to perform an analysis on a particular dataset is received. For example, host computing device 130 creates via user input, or a programmatic call from application instance 132 or an external system or program, a resource request 136 and transmits the resource request to the resource request instructions. The host computing device 130 may then transmit the resource request to server computer system 110. Creation of the resource request 136 may be performed using a front-end graphical user interface which may be programmed to provide forms, GUI widgets, or other facilities to specify what datasets are requested. Additionally or alternatively, the resource request 136 may be generated by an analytics program in response to a request by a user for analytics on a particular dataset. The resource request 136 may conform to a structured query language for accessing one or more data repositories.

At step 265, a determination is made that the particular dataset is stored in both the first data repository and the second data repository. For example, the server computer system 110 may parse a resource request in a structured query language to identify a dataset stored in the first data repository. The server computer may use one or more files or data stores to determine whether a view of the identified dataset is stored in the second data repository. For example, server computer system 110 may identify, in index metadata stored in the second data repository, data indicating that a view of the particular dataset is stored in the second data repository. While in an embodiment, the dataset is assumed to be stored in the first data repository, in other embodiments, the server computer system 110 may additionally utilize metadata and/or one or more mappings to determine whether the data is stored in the first data repository.

At step 270, the second data repository is selected based, at least in part, on an attribute of the request. For example, the server computer system 110 may execute the query analysis instructions 116 to perform a semantic analysis of the query. The server computer system 110 may determine, from the semantic analysis of the query, a type of query and/or a target dataset for executing the query. The server computer system 110 may additionally obtain additional information regarding the target dataset for the query. Descriptions of the types of attributes used to select a data repository are described further herein in the Query Analysis section.

At step 275, data from the particular dataset stored in the second data repository is used to respond to the request. For example, based on the semantic query analysis, the server computer 110 may determine that the more practical option is to execute the query against the columnar data store and return values, columns, and/or rows from the columnar data store in response to the query. Alternatively, the server computer 110 may determine that the more practical option is to request data from the distributed indexes. In embodiments where the query requests one or more rows, the server computer 110 may use the indices to rebuild the one or more rows and return the rebuilt rows in response to the query.

FIG. 2 depicts one example for performing an analysis of a query to determine which data repository to use as a backing store for responding to the query. By selecting a backing store based on an attribute of the query, the server computer 110 is able to identify the best data store for responding to a query on the fly. In embodiments where the query requests data subject to access controls or which would be most efficient to be accessed from the index, the server computer 110 may select the data repository containing the access controls and the index. In situations where the query requests data which would be most efficient to be accessed from a columnar data store, the server computer 110 may select the columnar data store for responding to the query.

Query Analysis

FIG. 3 depicts a method of analyzing a query to identify a backing store for responding to the query. The individual elements of 306-312 in FIG. 3 may be used on their own in conjunction with element 304 to select a backing store, in conjunction with any of the other elements and element 304, or in conjunction with all of the other elements. For example, in an embodiment a server computer system may identify a backing data store based only on elements 304 and 306. In a separate embodiment, the server computer system may select a backing store based on elements 304, 308, 310, and 312.

In FIG. 3, one or more datasets are stored in a columnar data store. An index data repository comprises a view of one or more datasets that are stored in the columnar data store. At step 302, the server computer system receives a query using any of the methods described herein where the query identifies a dataset. At step 304, the server computer system determines whether a view of the dataset is stored in the index data repository. For example, the index data repository may store index metadata identifying the datasets stored in the index data repository. The server computer system may request the index metadata from the index data repository to determine whether the dataset is identified in the index metadata. If a view of the dataset is not stored in the index data repository, the process moves to step 316 and the server computer system executes the query against the columnar data store. If a view of the dataset is stored in the index data repository, the process proceeds to step 306.

At step 306, the server computer system determines whether the dataset is subject to access controls which are stored in the index data repository. For example, the index metadata may include data identifying whether each dataset stored in the index data repository is subject to access controls. If the dataset is subject to access controls, the process continues to step 314 and the server computer system executes the query using the index data repository. If the dataset is not subject to access controls, the process continues with step 308. By performing the analysis of the query to determine whether the dataset is subject to access controls, the server computer system can store a plurality of datasets for one or more users where a subset of the plurality of datasets are subject to access controls while another subset of the plurality of datasets are not subject to access controls. Thus, the use of access controls on one dataset would not require access control data to be stored for each stored dataset.

Additionally or alternatively, the server computer may use the index metadata to identify the access controls and request a pre-filter from the index data repository which identifies the resources in the columnar data store that the user may access. The server computer may then use the access controls as an additional filter to be used in conjunction with the query when the query is executed. Thus, step 306 may still be used to identify the access controls without being dispositive in determining which data repository is accessed.

At step 308, the server computer system determines whether the dataset contains more than a threshold number of rows. For example, the server computer system may store a row threshold value identifying a threshold number of rows in a dataset. The server computer system may additionally store a value for each dataset stored in the columnar data store and/or in the index data repository indicating a number of rows in the dataset. If, for the requested dataset, the number of rows exceeds the row threshold value, the process continues with step 310. If the row threshold value exceeds the number of rows in the dataset, the process continues to step 316 and the server computer system executes the query using the columnar data store. Thus, the server computer system essentially determines that the number of rows in the dataset is low enough that using the index data repository would not significantly increase performance of the server computer system.

At step 310, the server computer system determines whether the query includes a column aggregation. A column aggregation, as described herein, refers to any use of all of the values in a particular column. For example, a column aggregation may include a summation of values in a column, an average of values in a column, a maximum or minimum value of values in a column, and/or a range of values in a column. The server computer system may use the semantic analysis of the query to determine whether the query includes any column aggregations. If the query includes a column aggregation, the process continues with step 316 and the server computer system executes the query using the columnar data store. If the query does not include a column aggregation, the process continues with step 312.

At step 312, the server computer system determines whether the query includes a filtering condition. A filtering condition, as described herein, refers to a condition that filters rows such that less than all of the rows may be used to respond to the query. For example, a filtering condition may include partial string matching, value searches, and/or row filters. The server computer system may use the semantic analysis of the query to determine whether the query includes any filtering conditions. If the query includes a filtering condition, the process continues with step 314 and the server computer system executes the query using the index data repository. If the query does not include a filtering condition, the process continues with step 316 and the server computer system executes the query using the columnar data store.

In an embodiment, the filtering condition may include filters generated by access controls as opposed to the access controls being dispositive. For example, the server computer system may determine that the dataset is subject to access controls. In response, the server computer system may identify, based, at least in part, on the requestor and the access control lists, one or more rows that user may access. The server computer system may augment the query to include a filter based on the access control list, such that aggregations may still be performed, but the server computer system does not return full rows of data that the requestor does not have access to. If, at step 312, a filter based on access controls is identified, the server computer system may continue with step 314 and execute the query using the data repository.

In an embodiment, the server computer system may further determine whether a query with a filtering condition would return a small number of rows or a large number of rows before selecting a backing store for executing the query. For example, the server computer system may first use the index to identify a number of rows that satisfy the query. If the number of rows that satisfy the query are greater than a stored row threshold value, such as fifty rows, the server computer system may request the rows from the columnar data store. If the number of rows that satisfy the query are lower than the stored row threshold value, the server computer system may use the index to rebuild the rows.

In an embodiment, the server computer system uses a proportional value as the row threshold value. For example, if the row threshold value is set at ten percent, then the server computer system may respond to a query that would return less than ten percent of the rows of the dataset with rows rebuilt from the index data repository. Alternatively, if a query would return more than ten percent of the rows of the dataset, the server computer system may respond to the query with rows from the columnar data store.

Adding Views of Datasets to a Second Repository

In an embodiment, a subset of the datasets stored in the columnar data store are indexed in the index data repository. The server computer system may dynamically identify datasets to index into the index data repository based on the size of the datasets, the usage of the datasets, and/or other needs of the system.

In an embodiment, the server computer system stores a row threshold value identifying a threshold number of rows of a dataset, such that a dataset with less than the threshold number of rows is not stored in the index data repository. By limiting the datasets stored in the index data repository based on a number of rows, the server computer system may increase the efficiency of responding to queries while optimizing the storage space for the datasets. Thus, a dataset which is less likely to need an index is less likely to be stored in the index data repository.

In an embodiment, the server computer system identifies datasets to index in the index data repository based on usage. For example, in the method of FIG. 3, at step 304, the server computer system determines whether a view of the dataset is stored in the index data repository. If a view of the dataset is not stored in the data repository, the server computer system uses the dataset stored in the columnar data store. In an embodiment, in addition to using the dataset stored in the columnar data store, the server computer system increments a value indicating a number of times a query was executed against the dataset. The server computer system may additionally store a query threshold value. If the incremented value for a dataset exceeds the query threshold value, the dataset may be indexed into the index data repository.

In an embodiment, the server computer identifies datasets to index in the index data repository based on usage for a particular period of time. For example, the server computer may reset the incremented values for each dataset periodically, such as each twenty-four hours. Thus, a dataset may be indexed in the data repository if an incremented value indicating a number of uses of the dataset exceeds a threshold value within a twenty-four hour period. By using an incrementing value which resets after a particular period of time, the server computer system is able to optimize storage of datasets based on peak usage.

In an embodiment, the server computer only increments a value for a dataset if a query against the dataset would have been executed against the index data repository had the dataset been stored in both the columnar data store and the index data repository. For example, if a query against the dataset includes an aggregation of values in a column, the server computer system may not increment the value as the query would have been executed against the columnar data store. In contrast, if the query does not include an aggregation but does include a filtering condition, the server computer system may increment the value as the query would have accessed the index data repository instead of the columnar datastore.

By only incrementing the value when a query to the database would have been executed using the index data repository, the server computer system is able optimize storage of datasets based on likely usage. Thus, if a user group performs a large number of aggregation queries against a dataset, the server computer system may continue to only store the dataset in the columnar data store as adding the dataset to the index data repository may have a relatively small effect on performance.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
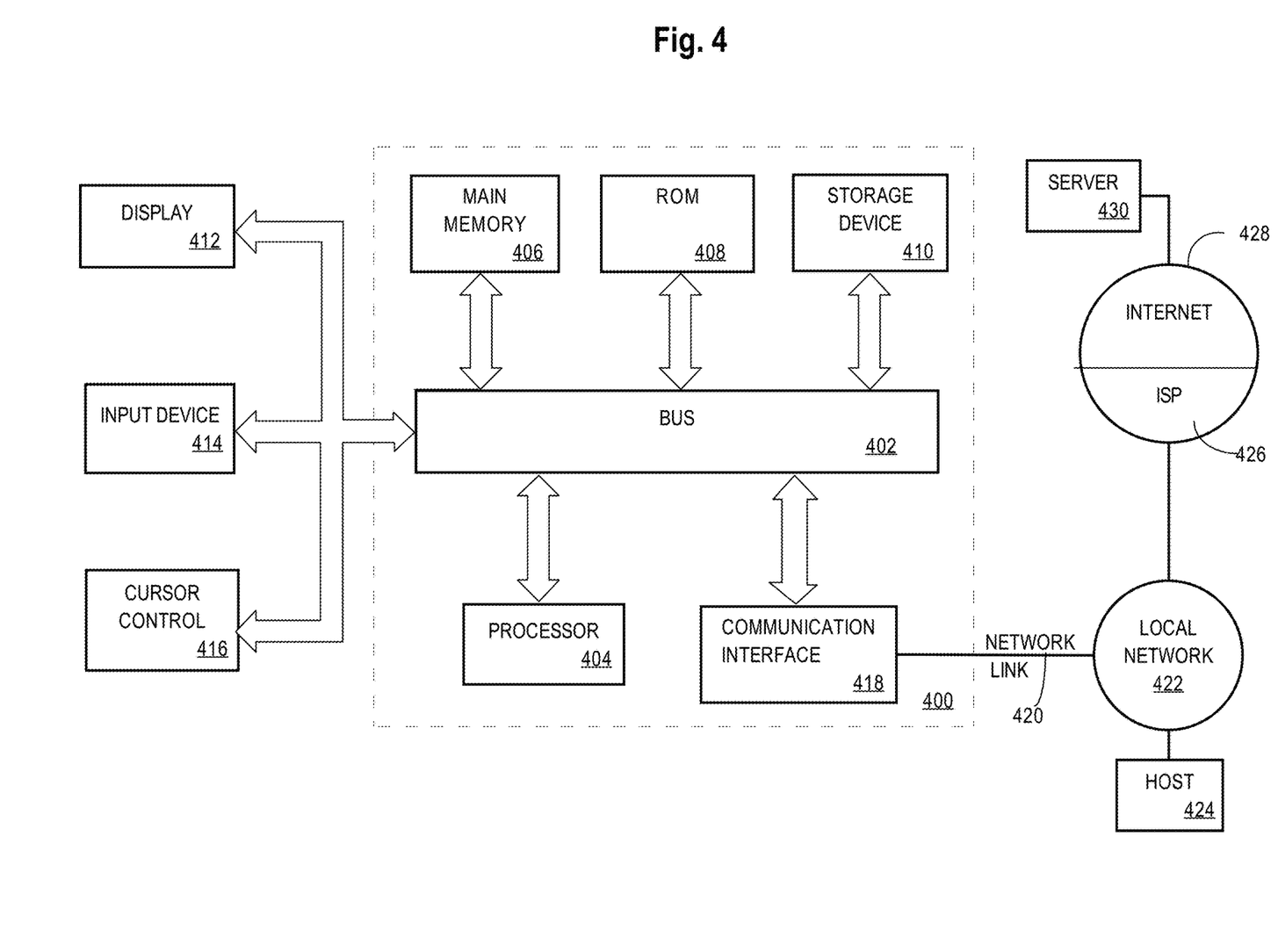
FIG. 4 is a block diagram that illustrates a computer system upon which an embodiment may be implemented.

For example, FIG. 4 is a block diagram that illustrates a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Implementation Example—Basic Software System

Figure 5:
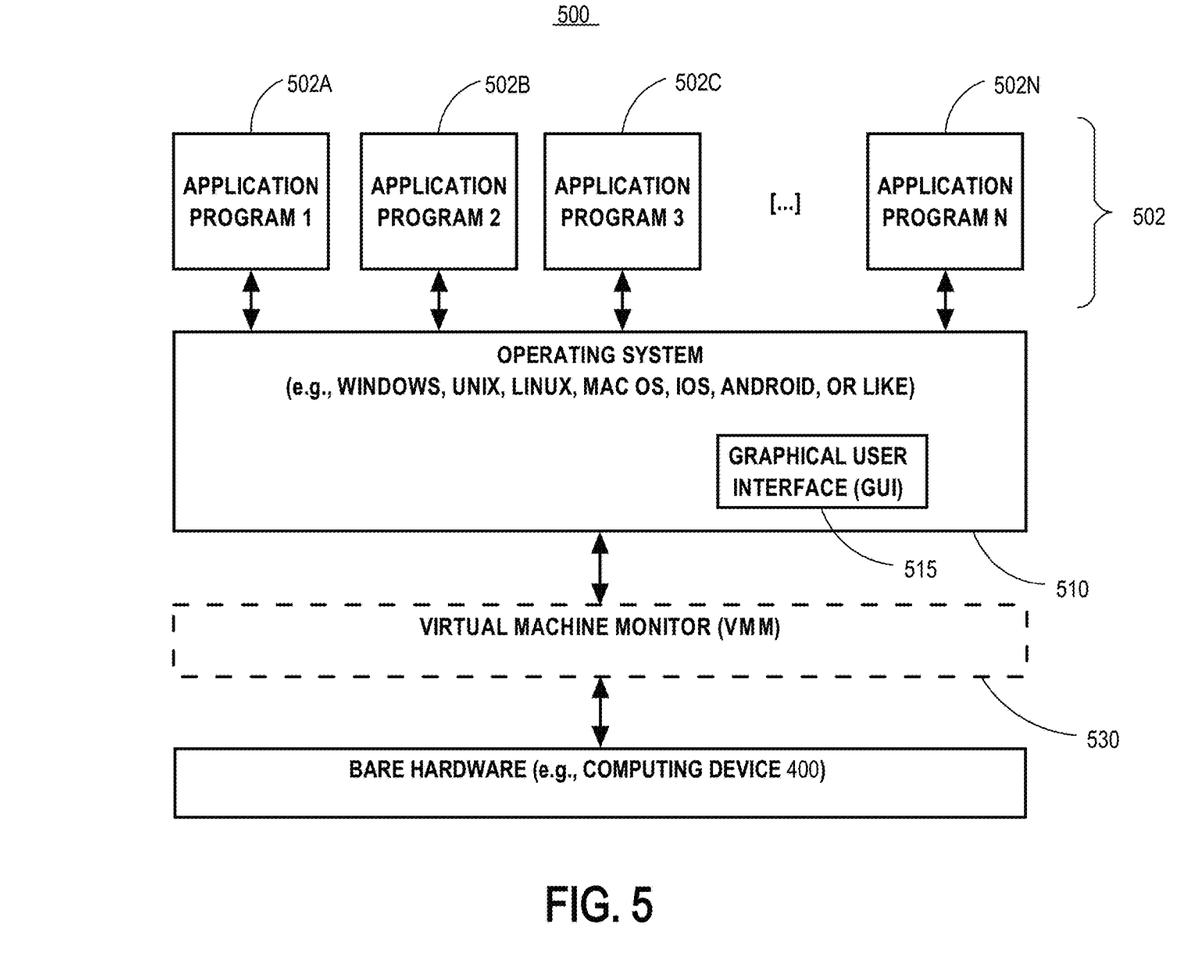
FIG. 5 is a block diagram of a basic software system that may be employed for controlling the operation of a computing device.

FIG. 5 is a block diagram of a basic software system 500 that may be employed for controlling the operation of computing device 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing device 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on device 500 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of device 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the device 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of device 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

EXTENSIONS AND ALTERNATIVES

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A system comprising:
one or more processors;
a memory storing instructions which, when executed by the one or more processors, cause performance of:
storing, in a columnar datastore, one or more first datasets;
storing, in an index data repository, indices of one or more second datasets;
receiving a request to perform an analysis on a particular dataset;
in response to receiving the request to perform an analysis on the particular dataset, determining that the particular dataset is stored in the columnar datastore and an index of the particular dataset is stored in the index data repository;

in response to determining that the particular dataset is stored in the columnar datastore and an index of the particular dataset is stored in the index data repository, performing:

determining whether the request comprises a filter of the particular dataset for one or more key terms;

if the request comprises a filter of the particular dataset for one or more key terms, selecting the index data repository instead of the columnar datastore in response to determining that the request comprises a filter of the particular dataset for one or more key terms and responding to the request with data from the index of the particular dataset stored in the index data repository;

if the request does not comprise a filter of the particular dataset for one or more key terms, determining whether to select the index data repository or the columnar datastore and responding to the request with data from the columnar datastore if the columnar datastore is selected.

2. The system of claim 1, wherein the instructions, when executed by the one or more processors, further cause performance of:

receiving a second request for data from a second particular dataset;

determining that the second particular dataset is stored in the columnar datastore and an index of the second particular dataset is stored in the index data repository;

determining that the second request is at least partially for data that is subject to access controls;

selecting the index data repository in response to determining that the request is at least partially for data that is subject to access controls and responding to the request with data from the index of the particular dataset stored in the index data repository.

3. The system of claim 1, wherein the instructions, when executed by the one or more processors, further cause performance of:

receiving a second request for data from a second particular dataset;

determining that the second particular dataset is stored in the columnar datastore and an index of the second particular dataset is stored in the index data repository;

determining that the second request is at least partially for data from the second particular dataset which comprises less than a threshold number of rows of data;

selecting the columnar datastore store based, at least in part, on the determination that the second request is at least partially for data from the second particular dataset which comprises less than the threshold number of rows of data;

responding to the second request with data from the columnar datastore.

4. The system of claim 1, wherein the instructions, when executed by the one or more processors, further cause performance of:

receiving a second request for data from a second particular dataset;

determining that the second particular dataset is stored in the columnar datastore and an index of the second particular dataset is stored in the index data repository;

determining that the second request is at least partially to perform an aggregation of values in one or more columns in the second particular dataset;

selecting the columnar datastore based, at least in part, on the determination that the request is at least partially to perform an aggregation of values in one or more columns of the second particular dataset;

responding to the request with data of the second particular dataset stored in the columnar datastore.

5. The system of claim 1, wherein the instructions, when executed by the one or more processors, further cause performance of:

storing an access threshold value;

determining that, within a particular period of time, the particular dataset has been accessed from the first data repository a number of times that is greater than the access threshold value and, in response, storing an index of the particular dataset in the index data repository.

6. The system of claim 1, wherein the instructions, when executed by the one or more processors, further cause performance of:

storing an attribute type threshold value;

determining that, within a particular period of time, a query with a particular type of attribute has been run against the particular dataset from the columnar datastore a number of times that is greater than the attribute type threshold value and, in response, storing an index of the particular dataset in the index data repository.

7. One or more non-transitory computer-readable media storing instructions which, when executed by one or more processors, cause performance of:

storing, in a columnar datastore, one or more first datasets;

storing, in an index data repository, indices of one or more second datasets;

receiving a request to perform an analysis on a particular dataset;

in response to receiving the request to perform an analysis on the particular dataset, determining that the particular dataset is stored in the columnar datastore and an index of the particular dataset is stored in the index data repository;

in response to determining that the particular dataset is stored in the columnar datastore and an index of the particular dataset is stored in the index data repository, performing:

determining whether the request comprises a filter of the particular dataset for one or more key terms;

if the request comprises a filter of the particular dataset for one or more key terms, selecting the index data repository instead of the columnar datastore in response to determining that the request comprises a filter of the particular dataset for one or more key terms and responding to the request with data from the index of the particular dataset stored in the index data repository;

if the request does not comprise a filter of the particular dataset for one or more key terms, determining whether to select the index data repository or the columnar datastore and responding to the request with data from the columnar datastore if the columnar datastore is selected.

8. The one or more non-transitory computer-readable media of claim 7, wherein the instructions, when executed by the one or more processors, further cause performance of:

receiving a second request for data from a second particular dataset;

determining that the second particular dataset is stored in the columnar datastore and an index of the second particular dataset is stored in the index data repository;

determining that the second request is at least partially for data that is subject to access controls;

selecting the index data repository in response to determining that the request is at least partially for data that is subject to access controls and responding to the request with data from the index of the particular dataset stored in the index data repository.

9. The one or more non-transitory computer-readable media of claim 7, wherein the instructions, when executed by the one or more processors, further cause performance of:

receiving a second request for data from a second particular dataset;

determining that the second particular dataset is stored in the columnar datastore and an index of the second particular dataset is stored in the index data repository;

determining that the second request is at least partially for data from the second particular dataset which comprises less than a threshold number of rows of data;

selecting the columnar datastore store based, at least in part, on the determination that the second request is at least partially for data from the second particular dataset which comprises less than the threshold number of rows of data;

responding to the second request with data from the columnar datastore.

10. The one or more non-transitory computer-readable media of claim 7, wherein the instructions, when executed by the one or more processors, further cause performance of:

receiving a second request for data from a second particular dataset;

determining that the second particular dataset is stored in the columnar datastore and an index of the second particular dataset is stored in the index data repository;

determining that the second request is at least partially to perform an aggregation of values in one or more columns in the second particular dataset;

selecting the columnar datastore based, at least in part, on the determination that the request is at least partially to perform an aggregation of values in one or more columns of the second particular dataset;

responding to the request with data of the second particular dataset stored in the columnar datastore.

11. The one or more non-transitory computer-readable media of claim 7, wherein the instructions, when executed by the one or more processors, further cause performance of:

storing an access threshold value;

determining that, within a particular period of time, the particular dataset has been accessed from the first data repository a number of times that is greater than the access threshold value and, in response, storing an index of the particular dataset in the index data repository.

12. The one or more non-transitory computer-readable media of claim 7, wherein the instructions, when executed by the one or more processors, further cause performance of:

storing an attribute type threshold value;

determining that, within a particular period of time, a query with a particular type of attribute has been run against the particular dataset from the columnar datastore a number of times that is greater than the attribute type threshold value and, in response, storing an index of the particular dataset in the index data repository.

13. A data processing method comprising:

storing, in a columnar datastore, one or more first datasets;

storing, in an index data repository, indices of one or more second datasets;

receiving a request to perform an analysis on a particular dataset;

in response to receiving the request to perform an analysis on the particular dataset, determining that the particular dataset is stored in the columnar datastore and an index of the particular dataset is stored in the index data repository;

in response to determining that the particular dataset is stored in the columnar datastore and an index of the particular dataset is stored in the index data repository, performing:

determining whether the request comprises a filter of the particular dataset for one or more key terms;

when the request comprises a filter of the particular dataset for one or more key terms, selecting the index data repository instead of the columnar datastore in response to determining that the request comprises a filter of the particular dataset for one or more key terms and responding to the request with data from the index of the particular dataset stored in the index data repository;

when the request does not comprise a filter of the particular dataset for one or more key terms, determining whether to select the index data repository or the columnar datastore and responding to the request with data from the columnar datastore if the columnar datastore is selected.

14. The method of claim 13, further comprising:

receiving a second request for data from a second particular dataset;

determining that the second particular dataset is stored in the columnar datastore and an index of the second particular dataset is stored in the index data repository;

determining that the second request is at least partially for data that is subject to access controls;

selecting the index data repository in response to determining that the request is at least partially for data that is subject to access controls and responding to the request with data from the index of the particular dataset stored in the index data repository.

15. The method of claim 13, further comprising:

receiving a second request for data from a second particular dataset;

determining that the second particular dataset is stored in the columnar datastore and an index of the second particular dataset is stored in the index data repository;

determining that the second request is at least partially for data from the second particular dataset which comprises less than a threshold number of rows of data;

selecting the columnar datastore store based, at least in part, on the determination that the second request is at least partially for data from the second particular dataset which comprises less than the threshold number of rows of data;

responding to the second request with data from the columnar datastore.

16. The method of claim 13, further comprising:

receiving a second request for data from a second particular dataset;

determining that the second particular dataset is stored in the columnar datastore and an index of the second particular dataset is stored in the index data repository;

determining that the second request is at least partially to perform an aggregation of values in one or more columns in the second particular dataset;

selecting the columnar datastore based, at least in part, on the determination that the request is at least partially to perform an aggregation of values in one or more columns of the second particular dataset;

responding to the request with data of the second particular dataset stored in the columnar datastore.

17. The method of claim 13, further comprising:

storing an access threshold value;

determining that, within a particular period of time, the particular dataset has been accessed from the first data repository a number of times that is greater than the access threshold value and, in response, storing an index of the particular dataset in the index data repository.

18. The method of claim 13, further comprising:

storing an attribute type threshold value;

determining that, within a particular period of time, a query with a particular type of attribute has been run against the particular dataset from the columnar datastore a number of times that is greater than the attribute type threshold value and, in response, storing an index of the particular dataset in the index data repository.

* * * * *